US011503151B2

(12) United States Patent
Chu et al.

(10) Patent No.: US 11,503,151 B2
(45) Date of Patent: Nov. 15, 2022

(54) COMMUNICATION DEVICE HAVING BASE STATION FUNCTION OF DECT CELLULAR SYSTEM, AND COMMUNICATION SYSTEM

(71) Applicant: YEALINK (XIAMEN) NETWORK TECHNOLOGY CO., LTD., Fujian (CN)

(72) Inventors: Yingkun Chu, Fujian (CN); Yun Liao, Fujian (CN); Lianchang Zhang, Fujian (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 18 days.

(21) Appl. No.: 16/938,905

(22) Filed: Jul. 24, 2020

(65) Prior Publication Data

US 2021/0029238 A1    Jan. 28, 2021

(30) Foreign Application Priority Data

Jul. 25, 2019  (CN) .......................... 201910675562.9

(51) Int. Cl.
*H04M 1/72505* (2021.01)
*H04W 8/12* (2009.01)
*H04W 60/00* (2009.01)

(52) U.S. Cl.
CPC ......... *H04M 1/72505* (2013.01); *H04W 8/12* (2013.01); *H04W 60/00* (2013.01); *H04M 2250/08* (2013.01)

(58) Field of Classification Search
CPC ......... H04M 1/72505; H04M 1/72502; H04M 1/72412; H04M 1/72409; H04M 1/72448;
(Continued)

(56) References Cited

U.S. PATENT DOCUMENTS 6,731,945 B2 * 5/2004 Do ..................... H04M 1/72502
  455/414.1
2008/0297585 A1 * 12/2008 Chung .................. H04N 7/142
  348/14.02

(Continued)

FOREIGN PATENT DOCUMENTS

EP       849965 A1 * 6/1998 ............ H04M 1/725
WO  WO-2007059722 A1 * 5/2007 .......... H04M 1/2535

OTHER PUBLICATIONS

Mitel, MiVoice 6930 IP Phone User Guide, 58015128 Rev05 Release 1.4 User Guide for MiVoice Business, Sep. 2018 (Year: 2018).*

(Continued)

Primary Examiner — Nizar N Sivji

(57) ABSTRACT

Disclosed are a communication device having a base station function of a Digital Enhanced Cordless Telecommunications (DECT) cellular system, and a communication system. The communication device includes an IP phone and a DECT adapter. The IP phone is connected to the DECT adapter, to form a base station; and the DECT adapter is configured to wirelessly communicate with at least one cordless handset via DECT, so as to register information of the at least one cordless handset with the IP phone. The present application enables the IP phone to be externally connected to the DECT adapter to support a DECT mode, so that the IP phone possesses a base station function of a DECT cellular system. It is not required to deploy multiple different systems. Such an IP phone and other base stations can form a Multi-Cell DECT system, expanding the coverage of a DECT signal.

3 Claims, 3 Drawing Sheets

(58) Field of Classification Search
CPC .......... H04M 1/72484; H04M 7/2535; H04M 2250/08; H04W 76/14; H04W 8/12; H04W 60/00; H04W 88/08
See application file for complete search history.

(56) References Cited

U.S. PATENT DOCUMENTS

| | | | | |
|---|---|---|---|---|
| 2009/0061850 A1* | 3/2009 | Li | ..................... | H04M 1/72502 455/426.1 |
| 2011/0286443 A1* | 11/2011 | Wu | ........................ | H04W 8/06 370/310 |
| 2012/0020293 A1* | 1/2012 | Nix, Jr. | ............... | H04L 65/1036 370/328 |
| 2019/0141186 A1* | 5/2019 | Couse | ............... | H04M 3/42263 |
| 2019/0294777 A1* | 9/2019 | Cobo | .................. | G06F 13/4068 |

OTHER PUBLICATIONS

Michelle Wilson, "What Desktop Computer Ports Are Typically Available?", HP, Apr. 5, 2019 (Year: 2019).*
Mitel MiVoice 6930 Phone 58015128 Nov. 2016 (Year: 2016).*
Yealink SIP-T58V Smart Media Phone User Guide SIP-T58V and T58A Version 80.40 Nov. 2017 (Year: 2017).*
Yealink VP59 & SIP-T58A Phones User Guide—Jan. 2019 (Year: 2019).*
Wikipedia Digital Enhancement Cordless Telecommunications—2022 (Year: 2022).*

\* cited by examiner

COMMUNICATION DEVICE HAVING BASE STATION FUNCTION OF DECT CELLULAR SYSTEM, AND COMMUNICATION SYSTEM

This application claims priority to Chinese Patent Application Number 201910675562.9, filed on Jul. 25, 2019, which is herein incorporated by reference.

TECHNICAL FIELD

The present application relates to the field of mobile communications technologies, and in particular, to a communication device having a base station function of a Digital Enhanced Cordless Telecommunications (DECT) cellular system, and a communication system.

BACKGROUND

A Multi-Cell DECT system employs different base stations to generate a wireless network similar to a cellular network, and achieves seamless handover of a cordless handset between the different base stations. Moreover, a handset on a call can roam in the same Multi-Cell DECT system to continue the call, which is almost imperceptible to a user and the other party. In the prior art, the Multi-Cell DECT system is generally composed of a plurality of base stations and a plurality of cordless handsets which all support a DECT protocol, so that the handsets can be freely and seamlessly handed over between the different base stations. However, an existing Multi-Cell DECT system cannot be connected to an Internet Protocol (IP) phone. Therefore, use of the IP phone requires the addition of a base station capable of supporting an IP phone communication protocol, resulting in an increase in cost. Moreover, the maintenance personnel are required to maintain an IP phone system and the DECT system separately, increasing the cost in labor and time.

SUMMARY

The technical problem to be solved by embodiments of the present application lies in providing a communication device having a base station function of a DECT cellular system, and a communication system, so that an IP phone can possess a base station function of a DECT cellular system, thus reducing the cost.

To solve the foregoing problem, an embodiment of the present application provides a communication device having a base station function of a DECT cellular system, which includes:

an IP phone and a DECT adapter, where
the IP phone is connected to the DECT adapter, to form a base station; and
the DECT adapter is configured to wirelessly communicate with at least one cordless handset via DECT, so as to register information of the at least one cordless handset with the IP phone.

Further, the IP phone includes a display and a DECT Server, where
the display and the DECT Server communicate with each other via a communication library msgkit;
the DECT Server and the DECT adapter communicate with each other via a Universal Serial Bus (USB); and
the DECT Server is configured to match the DECT adapter with the IP phone, where if the DECT adapter is successfully matched with the IP phone, the IP phone and the DECT adapter jointly form the base station.

Further, the IP phone further includes a corded handset, where
the corded handset and the cordless handset are configured to answer a currently incoming call.

Further, the device further includes: a voice handover module, where
the voice handover module is configured to, upon receiving a call handover instruction, hand over the currently incoming call between the corded handset and the cordless handset, or between a plurality of cordless handsets of which information is registered with the IP phone.

Further, the call handover instruction is generated when a corresponding instruction key on the IP phone is triggered.

Further, the IP phone and the DECT adapter are detachably connected via a USB interface of the IP phone.

Further, a communication system is provided, where the communication system is a Multi-Cell DECT system which includes a plurality of base stations, and at least one of the plurality of base stations is formed by a communication device having a base station function of a DECT cellular system that is described in the foregoing embodiments, so that a cordless handset of which information is registered with the base station formed by the communication device having a base station function of a DECT cellular system in any one of claims 1 to 6 can roam between the plurality of base stations.

The following advantageous effects are achieved by implementing the embodiments of the present application:

The embodiments of the present application provide a communication device having a base station function of a DECT cellular system, and a communication system. The communication device includes an IP phone and a DECT adapter. The IP phone is connected to the DECT adapter, to form a base station; and the DECT adapter is configured to wirelessly communicate with at least one cordless handset via DECT, so as to register information of the at least one cordless handset with the IP phone. Compared to the prior art, the present application enables the IP phone to be externally connected to the DECT adapter to support a DECT mode, so that the IP phone possesses a base station function of a DECT cellular system, achieving mobility and convenience. Thus, it is not required to deploy multiple different systems, reducing the input cost. Moreover, such an IP phone and other base stations can jointly form a Multi-Cell DECT system, expanding the coverage of a DECT signal.

DESCRIPTION OF EMBODIMENTS

The technical solutions in the embodiments of the present invention are clearly and completely described below with reference to the accompanying drawings of the embodiments of the present application. Apparently, the described embodiments are some rather than all of the embodiments of the present application. All other embodiments obtained by those of ordinary skill in the art based on the embodiments of the present application without creative efforts should fall within the protection scope of the present application.

Figure 1:
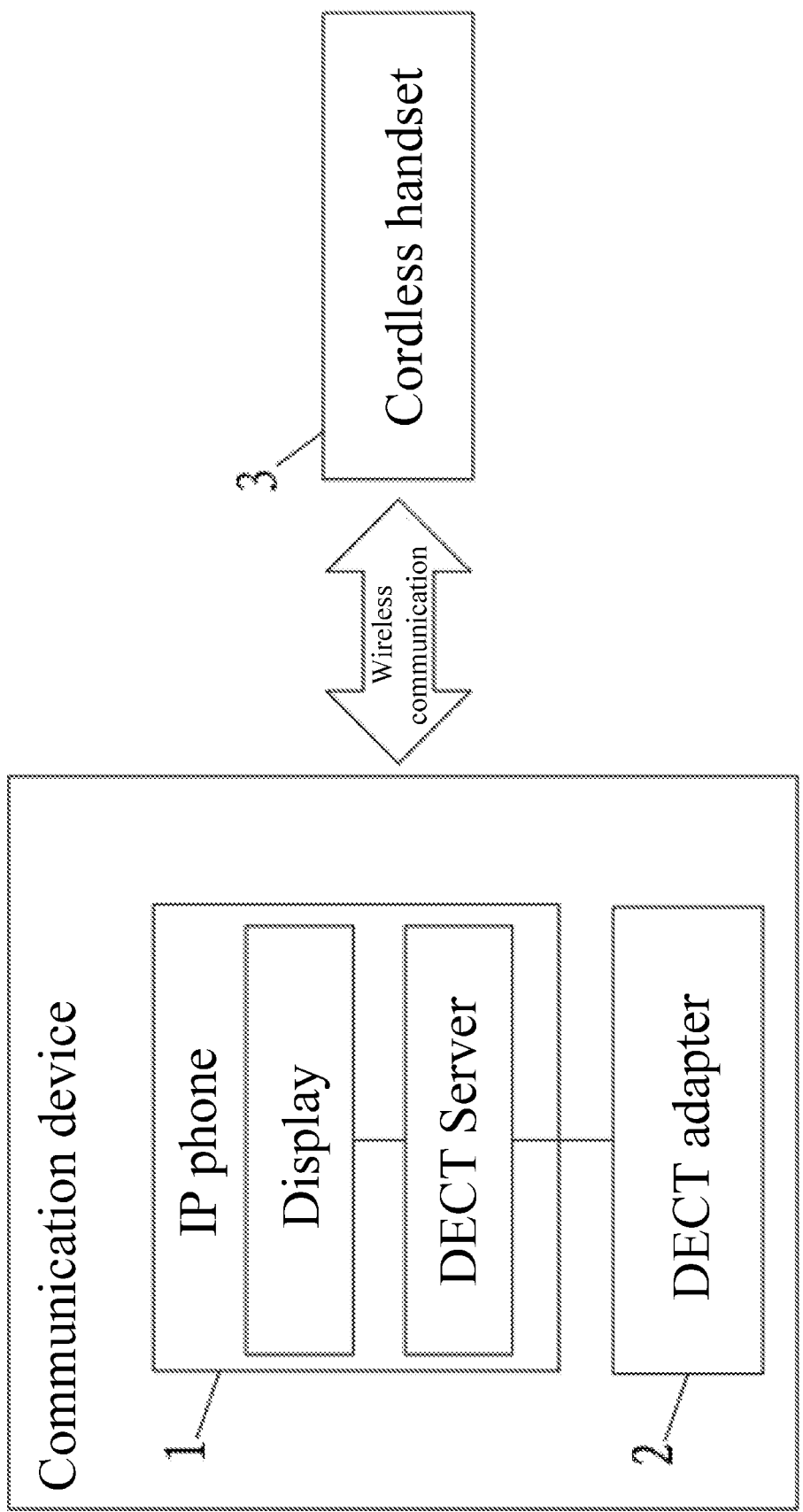
FIG. 1 is a schematic structural diagram of a communication device having a base station function of a DECT cellular system provided by an embodiment of the present application.

Referring to FIG. 1,

FIG. 1 is a schematic structural diagram of a communication device having a base station function of a DECT cellular system provided by an embodiment of the present application. As shown in FIG. 1, the communication device includes:

an IP phone 1 and a DECT adapter 2.

The IP phone 1 is connected to the DECT adapter 2, to form a base station.

The DECT adapter 2 is configured to wirelessly communicate with at least one cordless handset 3 via DECT, so as to register information of the at least one cordless handset 3 with the IP phone 1.

In this embodiment, the IP phone 1 and the DECT adapter 2 are detachably connected via a USB interface of the IP phone 1.

In this embodiment, the DECT adapter 2 is connected to the IP phone 1 via the USB interface of the IP phone 1, making the IP phone 1 automatically enter a DECT mode. Thus, the IP phone 1 is deployed into an existing Multi-Cell DECT system, and a cordless handset 3 of which information is registered with the IP phone 1 can roam between different base stations, expanding the coverage of a DECT signal and enhancing mobility and convenience of work.

In this embodiment, the DECT adapter 2 is removable. If the DECT adapter is disconnected from the IP phone 1, the phone automatically switches back to a Session Initiation Protocol (SIP) mode. Thus, the IP phone 1 can support both the SIP mode and the DECT mode, and further a rapid switch between the two modes can be realized.

In this embodiment, the DECT adapter 2 may register information of a plurality of cordless handsets 3 with the IP phone 1, so that any cordless handset 3 can be used to receive an incoming call on the IP phone 1.

In this embodiment, the IP phone 1 includes a display and a DECT Server.

The display and the DECT Server communicate with each other via a communication library msgkit. The DECT Server and the DECT adapter 2 communicate with each other via a USB.

The DECT Server is configured to match the DECT adapter 2 with the IP phone. If the DECT adapter is successfully matched with the IP phone, the IP phone and the DECT adapter jointly form the base station.

The display may be a device with a display interface commonly used in the field, such as a display screen, a touch display, a touch screen, or the like. The display and the DECT Server communicate with each other via the communication library msgkit which is applicable to many fields. In the DECT system, the communication library msgkit can be used to control communication between different processes, for example, between the DECT Server and the display or between DECT and SIP.

Figure 2:
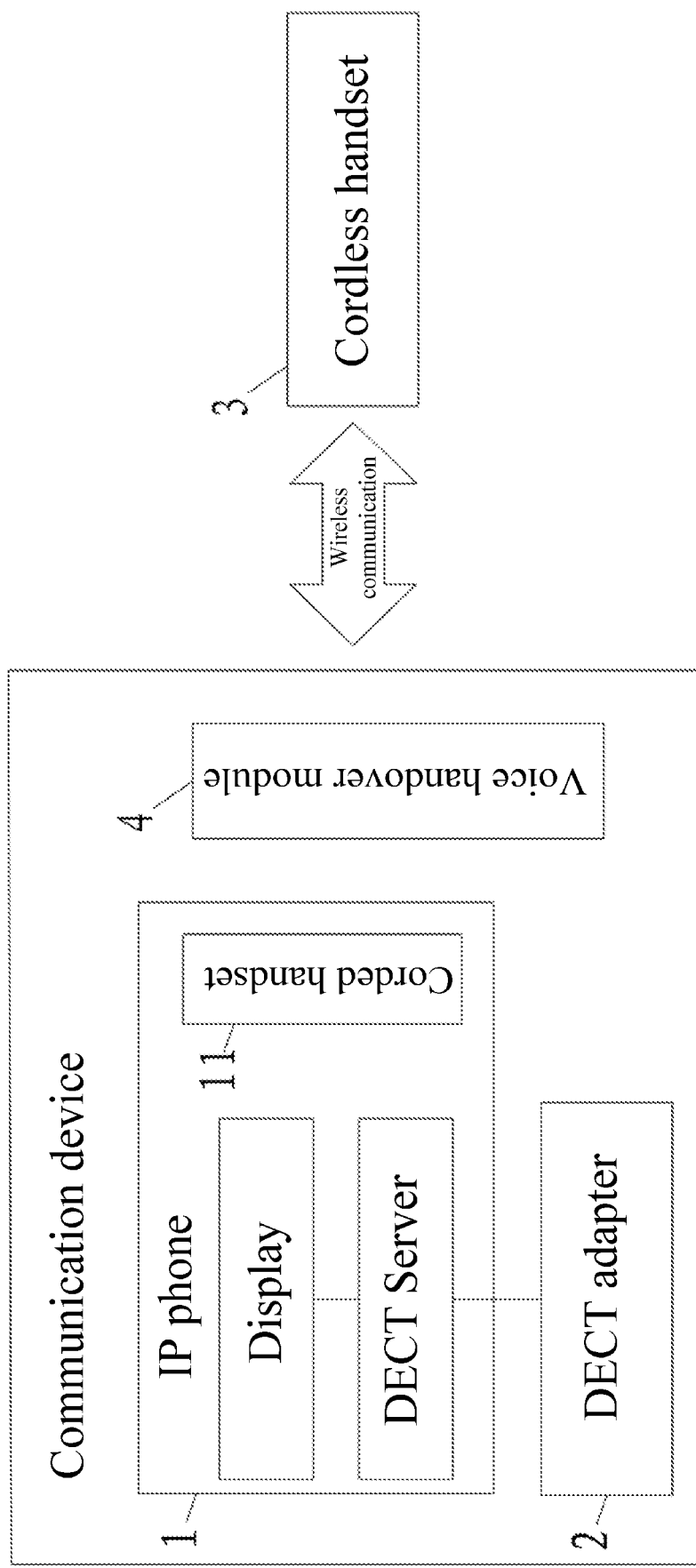
FIG. 2 is a schematic structural diagram of a communication device having a base station function of a DECT cellular system provided by another embodiment of the present application.

Further, refer to FIG. 2, which is a schematic structural diagram of a communication device having a base station function of a DECT cellular system provided by another embodiment of the present application.

In this embodiment, the IP phone 1 further includes a corded handset 11. The corded handset 11 is configured to answer a currently incoming call. When a new call comes in, the corded handset 11 or the cordless handset 3 may be selected to answer the incoming call. If there is no available cordless handset currently, the corded handset 11 may be used to answer the incoming call, so that the call is answered more conveniently.

In this embodiment, the communication device further includes a voice handover module 4. The voice handover module 4 is configured to, upon receiving a call handover instruction, hand over the currently incoming call between the corded handset and the cordless handset, or between a plurality of cordless handsets of which information is registered with the IP phone 1. The voice handover module may be one or more processors or an integrated chip; and may include a memory, a transmission interface, a system bus, and the like if required. The processor or the integrated chip implements corresponding functions when running a computer program.

Figure 3:
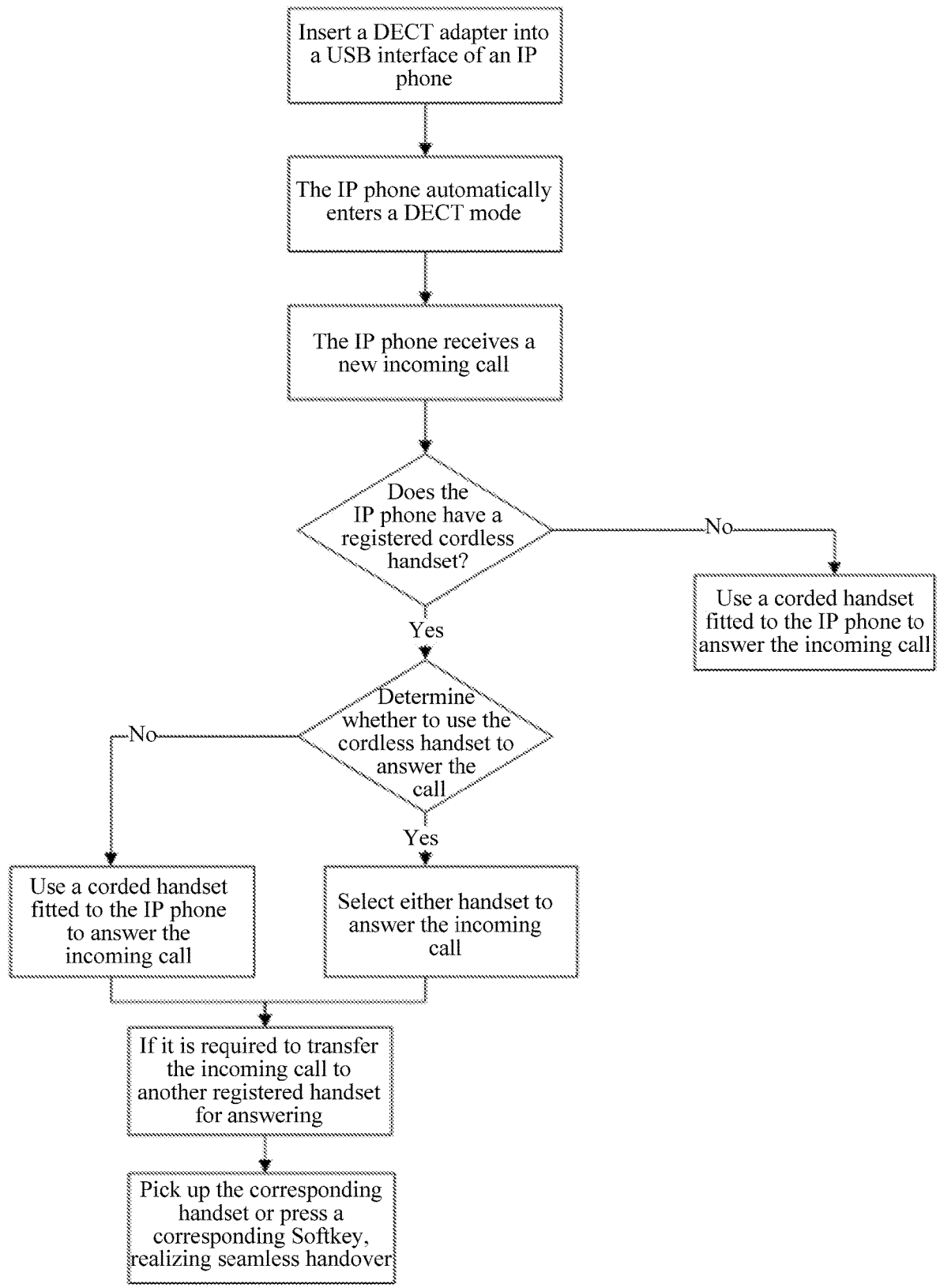
FIG. 3 is an operation flowchart of answering an incoming call and call handover by the communication device in a DECT mode.

In this embodiment, the call handover instruction is generated when a user picks up the handset or triggers a corresponding key on the IP phone 1. A specific operation flowchart of answering an incoming call and call handover by using the communication device is shown in FIG. 3. The embodiments of the present application provide a communication device having a base station function of a DECT cellular system, which includes an IP phone and a DECT adapter. The IP phone is connected to the DECT adapter, to form a base station; and the DECT adapter is configured to wirelessly communicate with at least one cordless handset via DECT, so as to register information of the at least one cordless handset with the IP phone. Compared to the prior art, the present application enables the IP phone to be externally connected to the DECT adapter to support a DECT mode, so that the IP phone possesses a base station function of a DECT cellular system, achieving mobility and convenience. Thus, it is not required to deploy multiple different systems, reducing the input cost. Moreover, such an IP phone and other base stations can jointly form a Multi-Cell DECT system, expanding the coverage of a DECT signal.

Still another embodiment of the present application provides a communication system which is a Multi-Cell DECT system. The Multi-Cell DECT system includes a plurality of base stations, and at least one of the plurality of base stations is formed by a communication device having a base station function of a DECT cellular system that is described in any one of the foregoing embodiments, so that a cordless handset of which information is registered with the base station formed by the communication device having a base station function of a DECT cellular system described in any one of the foregoing embodiments can roam between the plurality of base stations.

A procedure of roaming between the plurality of base stations by the cordless handset is as follows: When a cordless handset registered with a first base station roams, a call is re-established with the cordless handset at a second base station, and coding and decoding are performed; and the first base station forwards voice data to the second base station via a Real-time Transport Protocol (RTP). If the cordless handset further roams to a third base station, a call is established with the cordless handset at the third base station. The first base station stops forwarding the voice data to the second base station. Instead, it forwards the voice data to the third base station, so that the cordless handset freely roams and is handed over between the different base station in the same system.

The above merely describes preferred embodiments of the present application. It should be noted that, several improvements and modifications may be made by those of ordinary skill in the art without departing from the principle of the present application, and these improvements and modifications should also be considered within the scope of protection of the present invention.

The invention claimed is:

1. A communication device having a base station function of a Digital Enhanced Cordless Telecommunications (DECT) cellular system, comprising:

an IP phone and a DECT adapter, wherein the IP phone is connected to the DECT adapter, to form a base station; and the DECT adapter is configured to wirelessly communicate with at least one cordless handset via DECT, so as to register information of the at least one cordless handset with the IP phone;

wherein the IP phone comprises a display and a DECT server;

the DECT server and the DECT adapter communicate with each other via a Universal Serial Bus (USB); and the DECT server is configured to match the DECT adapter with the IP phone, where if the DECT adapter is successfully matched with the IP phone, the IP phone and the DECT adapter jointly form the base station;

wherein the IP phone further comprises a corded handset; and the corded handset and the cordless handset are configured to answer a currently incoming call;

wherein the IP phone and the DECT adapter are detachably connected via a USB interface of the IP phone;

wherein the communication device is further configured to enable the IP phone automatically to enter a DECT mode when the DECT adapter is inserted into the USB interface of the IP phone;

judge whether the IP phone has a registered cordless handset when the IP phone receives the currently incoming call;

determine whether to use a registered cordless handset to answer the call if the IP phone has a registered cordless handset; if yes, select either registered cordless handset to answer the call; if no, use the corded handset fitted to the IP phone to answer the call; and use the corded handset fitted to the IP phone to answer the call if the IP phone does not have a registered cordless handset.

2. The communication device having a base station function of a DECT cellular system according to claim 1, further comprising a voice handover module, wherein the voice handover module is configured to, upon receiving a call handover instruction, hand over the currently incoming call between the corded handset and the cordless handset, or between a plurality of cordless handsets of which information is registered with the IP phone.

3. The communication device having a base station function of a DECT cellular system according to claim 2, wherein the call handover instruction is generated when a corresponding instruction key on the IP phone is triggered.

* * * * *